United States Patent [19]

Watanabe et al.

[11] Patent Number: 4,894,163

[45] Date of Patent: Jan. 16, 1990

[54] SEPARATION OF LIQUID MIXTURES

[75] Inventors: Kazunori Watanabe, Tsukuba; Yoshio Fuchigami, Okayama, both of Japan

[73] Assignee: Kuraray Co., Ltd., Kurashiki, Japan

[21] Appl. No.: 202,527

[22] Filed: Jun. 6, 1988

[30] Foreign Application Priority Data

Jun. 12, 1987 [JP] Japan .................................. 62-147305

[51] Int. Cl.$^4$ .............................................. B01D 13/00
[52] U.S. Cl. .................................... 210/640; 210/654; 210/181
[58] Field of Search ......................... 40/640, 654, 181; 55/16, 158

[56] References Cited

U.S. PATENT DOCUMENTS

| | | | |
|---|---|---|---|
| 2,953,502 | 9/1960 | Binning et al. | 210/640 X |
| 2,956,070 | 10/1960 | Jennings et al. | 210/638 X |
| 4,067,805 | 1/1978 | Chiang et al. | 210/654 X |
| 4,265,713 | 5/1981 | Cheng | 210/640 X |

OTHER PUBLICATIONS

Takashi Ishikawa, Chemical Engineering, 29(6), 19 (1984).
Takashi Ishikawa, Kagaka Sochi (Chemical Apparatus), 25(12), 27 (1983).
C. Y. Choo, "Advances in Petroleum Chemistry and Refining", vol. VI (1962) p. 72.

Primary Examiner—Frank Spear
Attorney, Agent, or Firm—Oblon, Spivak, McClelland, Maier & Neustadt

[57] ABSTRACT

The invention provides an industrially advantageous method of separating liquid mixtures which can reduce the liquid film temperature drop in module units. As a result, the separation system can be rendered compact, the treatment capacity can be increased and the cost can be reduced. Thus, the method of the invention is effective in curtailment of separation and purification processes in the chemical industry and in putting high-efficiency membrane separation techniques to practice use. Its industrial utility is very great.

14 Claims, 2 Drawing Sheets

SEPARATION OF LIQUID MIXTURES

BACKGROUND OF THE INVENTION

1. Field of the Invention

This invention relates to a method of separating liquid mixtures. More particularly, it relates to an industrially advantageous method of separating liquid mixtures by pervaporation which comprises supplying the feed liquid mixture in the form of a mixed fluid at least part of which is in the form of a vapor to a membrane separator for direct contact of said vapor with a liquid film occurring on a permeation membrane and consisting of said liquid mixture to thereby cause partial condensation of said vapor in said liquid film so that the temperature decrease in the liquid mixture on the permeation membrane can be reduced.

2. Description of the Prior Art

The so-called pervaporation which comprises separating a mixture of liquids by feeding the liquid mixture to one side of a permeation membrane, while maintaining the opposite side of said membrane under reduced pressure by connecting to a vacuum source or while maintaining said opposite side at a lower partial vapor pressure by passing an inert gas, to thereby cause liquid permeation under the resulting pressure gradient and evaporation of the permeate liquid on the lower pressure side has been a subject of study since the mid-1950's. This separation method has been devised for the separation and/or purification of those liquids (mostly, organic solvents, hydrocarbons, etc.) which cannot be fractionated by ordinary distillation methods. Known examples of its application include fractional separation of azeotropic mixtures, solvents close in boiling point, isomers (ortho and para, cis and trans) and the like, concentration and/or purification of heat-degradable liquid mixtures or juices, removal of trace impurities, and removal of byproduct water during esterification reactions [for example, U.S. Pat. No. 2,953,502; C. Y. Choo, "Advances in Petroleum Chemistry and Refining", vol. VI (1962), page 72; U.S. Pat. No. 2,956,070].

As mentioned above, pervaporation is a method of separation which invariably involves the liquid-to-gaseous phase change. The heat (latent heat) required for said phase change comes from the sensible heat of the liquid mixture fed to the separation apparatus. Therefore, the liquid temperature in the separation apparatus gradually decreases. The greater the quantity of the permeant liquid, the more significant the temperature decrease is.

On the other hand, it is known that the membrane separation efficiency in pervaporation is highly temperature-dependent. Thus, generally, when the temperature is lowered, the quantity in which the permeant can permeate the membrane decreases. When, conversely, the temperature rises, the separability (separation factor) tends to become worse. As a result, there is an optimum separation temperature range for each liquid mixture and, moreover, the range is not so wide. Therefore, it is important in practical use of pervaporation to operate such that the liquid temperature difference in the membrane separator (hereinafter referred to as module unit) will not become too great.

For solving such problems, the use of a number of module units with a heater disposed before each module unit, namely a multistep system, has been devised and tried [for example, Takashi Ishikawa, Chemical Engineering, 29 (6), 19 (1984); Takashi Ishikawa, Kagaku Sochi (Chemical Apparatus), 25 (12), 27 (1983)]. An example of such multistep system, which includes 4 module units, is schematically shown in FIG. 2. In the system shown in FIG. 2, a liquid mixture 10 is introduced into a first heater 11 and heated there to a temperature below the boiling point thereof and then introduced into a first module unit 12 at one end thereof. The nonpermeated portion 14, which has not permeated through the permeation membrane 13, is introduced into a second heater 15. Thereafter, in the same manner as mentioned above, said portion 14 from the first module is heated and then introduced into a second module unit 16, the non-permeated portion 18 which has not permeated through the membrane 17 is introduced into a third heater 19 and then into a third module unit 20, and the non-permeated portion 22 which has not permeated through the membrane 21 is introduced, via a fourth heater 23, into a fourth module unit 24. The non-permeated portion 26 which has not permeated the membrane 25 in the fourth module unit is one product. Another product is obtained by combining the vapors of the permeated liquid portions (permeates) which have permeated through the membranes 13, 17, 21 and 25 in the first to fourth module units, respectively, and recovering the resultant permeated fraction 27 or by recovering individually the permeate fractions 28, 29 30 and 31 respectively obtained from said vapors. As mentioned above, in multistep apparatus, heaters and module units are connected in series to form two or more heater-module unit sets (or steps), and the heat to be required in each module unit is supplied in the preceding heater, hence the whole heat required is supplied dividedly in portions.

However, a considerable number of steps are required for the separation temperature to be uniform in the above-mentioned multistep apparatus, and this renders the apparatus complicated. Therefore, 2 to 5 steps are generally used. Under these circumstances, the problem of making the separation temperature uniform remains unsolved even in such multistep systems as far as those cases in which the quantity of permeant liquid is great are concerned.

SUMMARY OF THE INVENTION

Accordingly, it is an object of the invention to provide a method of separating liquid mixtures with good efficiency which comprises feeding at least part of the liquid mixture to be separated in the form of a vapor.

Another object of the invention is to provide a method of separating liquid mixtures by which the temperature decrease occurring in the liquid mixture on the permeation membrane can be reduced.

A further object of the invention is to provide a method of separating liquid mixtures which comprises further purifying the fraction which has permeated through the permeation membrane and/or the non-permeated liquid portion which has not permeated through said membrane by means of a distillation column.

The above objects can be accomplished by providing a method of separating liquid mixtures by pervaporation which comprises supplying the feed liquid mixture in the form of a mixed fluid at least part of which is in the form of a vapor to a membrane separator for direct contact of said vapor with a liquid film occurring on a permeation membrane and consisting of the liquid mixture to thereby cause partial condensation of said vapor in said liquid film.

The method of this invention can reduce the temperature decrease in the liquid film on the permeation membrane even when the quantity of permeant liquid (permeate) is great. Said method is advantageous in separating liquid mixtures on commercial scales.

Figure 1A:
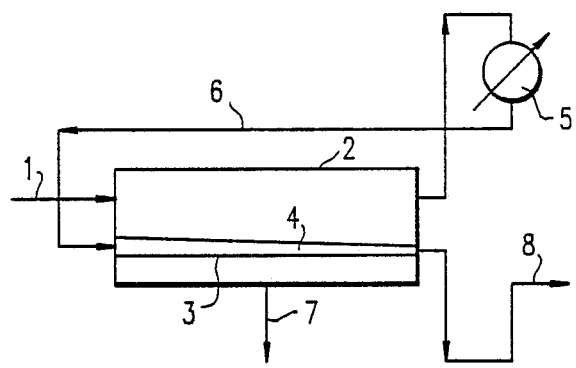
FIG. 1 is a sectional view schematically illustrating module units for three modes of use in the practice of the invention, wherein, in the module units (a), (b) and (c), the liquid film flows concurrently with, countercurrently to, and partly concurrently with and partly countercurrently to the mixed fluid supplied, respectively.

In the figures, the reference numeral 1 indicates the mixed fluid, 2 the module unit, 3 the permeation membrane, 4 the liquid film, 5 a condenser, 6 a connecting pipe, 7 the permeate, 8 the non-permeated liquid portion or fraction, 10 the liquid mixture, 11, 15, 19 and 23 each a heater, 12, 16, 20 and 24 each a module unit, 13, 17, 21 and 25 each a permeation membrane, 14, 18, 22 and 26 each a non-permeated liquid fraction, and 27, 28, 29, 30 and 31 each a permeate.

DETAILED DESCRIPTION OF THE INVENTION

The term "liquid mixtures" as used herein includes within the meaning thereof liquid mixtures composed of two or more components, for example organic-organic liquid mixtures and organic-water mixtures, and the state of mixture may be not only such that the respective components are each found uniformly distributed in a completely molecular or ionic form but also such that molecular association, ionic association, emulsion-like molecular aggregate formation or the like is involved therein. Typical examples of such liquid mixtures are methyl acetate-methanol, ethyl acetate-ethanol, benzenecyclohexane, methanol-acetone, benzene-methanol, benzene-ethanol, acetone-chloroform, methanol-acetone and ethanol-water mixtures. As liquid mixtures composed of components close in boiling point but separable by the present method, there may be mentioned ethylbenzene-styrene, para-chloroethylbenzene-parachlorostyrene, toluene-methylcyclohexane, butadiene-butane and butadiene-butane mixtures, for instance. The liquid mixtures further include, in addition to azeotropic mixtures such as mentioned above, liquid mixtures which are difficult to separate, for example water-acetic acid mixtures, and still further include liquid mixtures separable by ordinary distillation, for example water-methanol and water-acetone mixtures. When the concentration of the organic liquid is lower than the concentration thereof in the azeotropic mixture, the liquid mixture is generally concentrated in advance by distillation and, in this case, the vapor from the distillation column top can preferably be fed to the membrane separator as such without causing condensation thereof.

The liquid mixtures need not be binary mixtures such as mentioned above specifically but may be composed of three or more components. They may be liquid mixtures composed of an organic liquid and an inorganic liquid as well.

In the practice of the invention, the feed liquid mixture is supplied in the form of a mixed fluid at least part of which is in the form of a vapor to a module unit. It is preferable from the energy viewpoint that the following requirement be met:

$$Q \geq 0,$$

Q being defined by the equation $$Q = H_f - H_D - H_W$$

where
$H_f$ is the enthalpy of said mixed fluid itself,
$H_D$ is the enthalpy of the permeate, and
$H_W$ is the enthalpy of the non-permeated liquid fraction (that liquid portion which has not permeated through the membrane).

Desirable proportions of the vapor and liquid phases in said mixed fluid can be determined by calculating the value of q which is defined below and indicative of the thermal state of the mixed fluid as fed:

$$q = [\text{heat required to convert 1 mole of feed to a boiling-point vapor}]/[\text{molar latent heat of vaporization of feed}]$$

Thus, when the mixed fluid fed is a vapor-liquid mixture at its boiling point, q is in the range of $0 < q < 1$. In the state of a saturated vapor, $q = 0$. When it occurs as a vapor above the boiling point, $q < 0$. In the practice of the invention, it is therefore necessary that the mixed fluid to be supplied to the module unit should always satisfy the condition $0 \leq q < 1$ or $q < 0$. The fraction of the vapor phase in the feed can be calculated as $1 - q$.

In accordance with the invention, the liquid mixture is supplied to a membrane separator in the form of a mixed fluid which is at the boiling point and at least part of which is in the form of a vapor. The fraction of said vapor in said mixed fluid, namely $1 - q$, is preferably within the range of $0.03 < 1 - q < 1.0$, more preferably $0.05 < 1 - q < 0.85$.

In accordance with the invention, the liquid mixture is fed to a module unit in the form of a mixed fluid at least part of which is in the form of a vapor, as mentioned above. Part of the vapor comes in direct contact with the liquid film originating from the liquid mixture and occurring on the permeation membrane and is condensed thereon. The remainder of the vapor, if any, is liquefied in a condenser and the condensate is fed to the module unit as a liquid film. The module unit may have the condenser therewithin.

The direction of liquid film flow may be either the same as or opposite to the direction of mixed fluid flow, or both modes may be employed combinedly. The thickness of the liquid film is not particularly limited but may be varied freely according to the rate of permeation, physical properties of the mixture, and characteristics of the permeation membrane. However, for efficient heat transfer in the direction of liquid film thickness as resulting from contact of the vapor in the feed mixed fluid, a thinner film is preferred and, on the other hand, a certain thickness is required for stable liquid film formation on the permeation membrane. Generally, therefore, the liquid film thickness is preferably adjusted to 0.1 to 10 mm, more preferably 0.2 to 5 mm.

As the material for forming the permeation membrane to be used in the practice of the invention, there may be mentioned, among others, polyethylene, polyvinylidene fluoride, polyvinyl alcohol (inclusive of vinyl alcohol-based copolymers such as ethylene-vinyl alcohol copolymer), polyvinyl acetate, polymethylsiloxane, polyethylenimine, polybutadiene, polyvinyl chloride, cellulose acetate, polystyrene, silicone rubber, regenerated cellulose, polyamide, polyimide, polyamide-imide and natural polysaccharides. The active layer of said membrane is the so-called non-porous layer while the whole membrane structure may be homogeneous or non-homogeneous. The membrane thickness can be selected optionally but, generally, it is within the range of 1 to 500 μm, preferably 5 to 200 μm.

In the mode of pervaporation according to the invention, it is essential that that side of the membrane which is opposite to the side where the membrane comes into contact with the liquid mixture, namely the exhaustion chamber, be at a pressure lower than the pressure in the liquid mixture chamber. The pressure on the side where the membrane comes into contact with the liquid mixture (namely, the liquid mixture chamber) is 0.001 to 20 atmospheres and, since this pressure determines the operation temperature (boiling point of the liquid film at that pressure and temperatures in the vicinity thereof), a pressure which corresponds to a liquid film temperature of 20° C. to 200° C. is generally employed and the operation is preferably performed approximately at atmospheric pressure. In that case, the operation temperature is set at the normal boiling point or a temperature in the vicinity thereof. On the other hand, the opposite side (exhaustion chamber) is recommendably maintained at a pressure below atmospheric, preferably at a pressure not higher than 400 mmHg, more preferably not higher than 100 mmHg (vacuum).

Figure 1B:
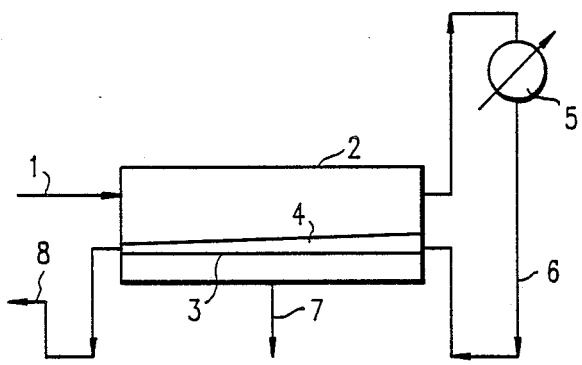
Figure 1C:
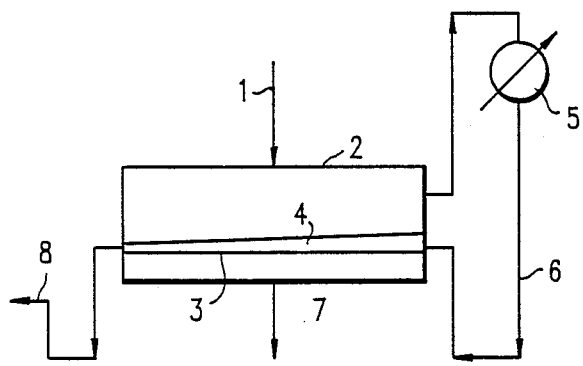
Figure 2:
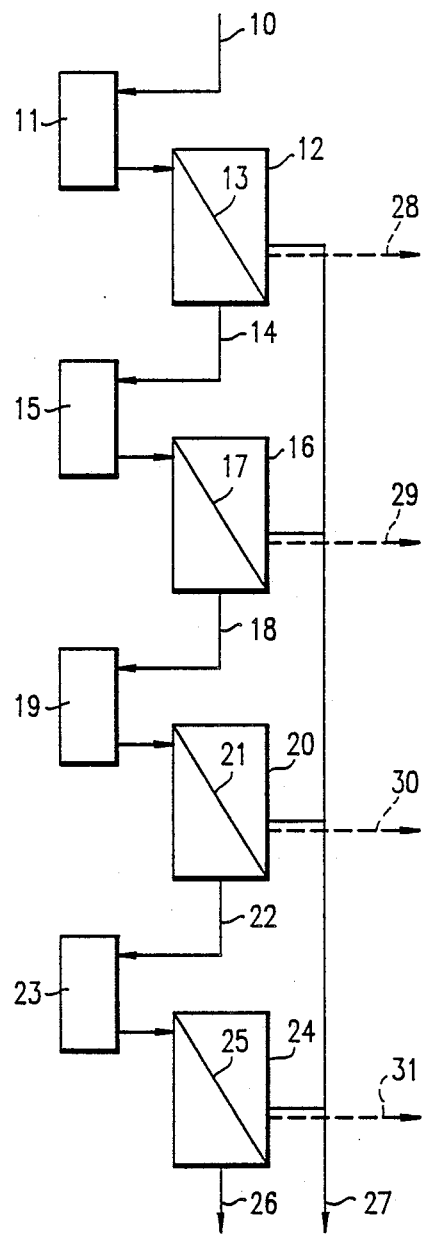
FIG. 2 is a schematic representation of a conventional multistep system.

Referring to the drawings, the method of separating liquid mixtures according to the invention is described in more detail. FIG. 1 is a sectional view schematically illustrating module units in which the method of the invention is carried out. In the module units (a), (b) and (c), the liquid film flows concurrently with, countercurrently to, and partly concurrently with and partly countercurrently to the mixed fluid fed, respectively. In the third mode, the mixed fluid is mostly supplied in a direction approximately perpendicular to the direction of liquid film flow. It is to be noted, however, that the third mode includes all flow modes other than the first (concurrent) and second (countercurrent) modes. In a preferred embodiment of the invention, the mixed fluid should be fed in a direction approximately perpendicular to the direction of flow of the liquid film from the operation viewpoint. The mixed fluid 1 at least part of which is in the form of a vapor is introduced into the module unit 2 at one end thereof, and part of the vapor comes into contact with the liquid film 4 flowing on a permeation membrane 3 and is condensed. The remainder portion of the vapor is condensed in a condenser 5 and the condensate is fed to the module unit in the form of liquid film 4 via a connecting pipe 6. The permeate fraction 7 and the non-permeated liquid portion 8 constitute products, respectively. They may be further purified by distillation as necessary.

In FIG. 1, only one module unit is used for each mode of operation. It is also possible to use a plurality of module units connected in series or in parallel as necessary. The condenser is not always necessary but is used in cases where there is a remainder vapor portion. As mentioned above, in the method of the invention all the heat required in the module unit is carried by the feed liquid mixture (as a result, at least part of the feed liquid mixture is converted to a vapor state) and the vapor is caused to come into direct contact, in the module unit, with the liquid film originating from the liquid mixture and is condensed so that the heat required can be covered by the latent heat released upon condensation of the vapor. Thus, the method of the invention has a characteristic feature which cannot have been anticipated at all from the findings obtained with multistep systems.

The separation method according to the invention is very advantageous from the industrial standpoint since the temperature decrease, which is significant in the prior art processes, can be limited to 10° C. or less, preferably 5° C. or less.

As mentioned above, the separation method according to the invention can reduce the temperature decrease in the liquid film in the module unit and makes it possible to perform the separation procedure with efficiency. While the reasons why such effects can be produced cannot be explained quite clearly, it is presumable that since, according to the invention, at least part of the feed mixture is in the form of a vapor, part of the vapor is directly condensed on the liquid film as soon as a temperature decrease occurs in the liquid film submitted to the module unit for separation as a result of heat consumption as the heat of vaporization in the pervaporation process and that the latent heat of said vapor is transferred to the liquid film and quickly restores the liquid film temperature substantially to a level before lowering, so that the liquid film can pass through the module unit practically without substantial temperature decrease and the decrease in permeation membrane performance resulting from temperature fall can be avoided.

The following examples are further illustrative of the present invention but are by no means limitative of the scope of the invention.

EXAMPLE 1

One module unit as shown in FIG. 1 (a) was used.

An azeotropic ethanol-water mixture vapor (ethanol 96% by weight) at its normal boiling point (78° C.) was fed to and passed through the module unit comprising a cellulose acetate flat membrane (membrane surface area 0.1 m$^2$; thickness 200 μm), and the condensate obtained in the condenser was again fed, in the liquid form, to the module unit to form an ethanol-water mixture liquid film (thickness 1,000 μm) on said membrane. Then, the permeate side was maintained at a pressure of 1 mmHg by means of a vacuum pump and a manostat while the azeotropic ethanol-water vapor (q=0) was continuedly fed to the module unit at a rate of 1.097 kg/hr for direct contact thereof with said liquid film and for condensation. The remaining vapor was condensed in the condenser and the condensate was fed to the module unit in the form of a liquid film via the connecting pipe. The permeate fraction was collected in a cold trap cooled with dry ice-acetone and analyzed for ethanol content by gas chromatography. The above operation was performed continuously. After a steady state was reached, an ethanol-water mixture having an ethanol concentration of 60% by weight was obtained as the permeate fraction at a rate of 0.097 kg/hr, while ethanol having a purity of 99.5% by weight was obtained as the non-permeated liquid portion at a rate of 1.0 kg/hr. In that state, the liquid film temperature on the upstream side (inlet side) was 78° C. and that on the downstream side (outlet side) was 76° C., hence substantially constant.

COMPARATIVE EXAMPLE 1

An ethanol-water mixture liquid having the azeotropic composition (ethanol 96% by weight) was heated approximately to its boiling point (76° C.) and fed to the module unit used in Example 1 in the liquid form at a rate of 1.098 kg/hr. The subsequent procedure was the same as in Example 1. An aqueous ethanol having an ethanol concentration of 46.1% by weight was obtained as the permeate fraction at a rate of 0.044 kg/hr, while the non-permeated liquid portion was obtained at a rate of 1.054 kg/hr and had an ethanol purity of 98.1% by weight. The liquid film temperature on the upstream side (inlet side) was 76° C. and that on the downstream side (outlet side) was 49° C. The temperature drop was as great as 27° C.

EXAMPLE 2

The procedure of Example 1 was followed in the same manner except that the azeotropic ethanol-water mixture vapor was partly liquefied (q=0.2) and then fed to the same module unit as used in Example 1 at a rate of 1.097 kg/hr (liquid film thickness 1,000 μm). An aqueous ethanol having an ethanol concentration of 59.6% by weight was obtained as the permeate fraction at a rate of 0.099 kg/hr, while 99.6% (by weight) pure ethanol was obtained as the non-permeated liquid at a rate of 0.998 kg/hr. The liquid film temperature was 76° C. both on the upstream side and on the downstream side and no substantial temperature fall was observed. The mixed fluid was also fed to the apparatus in the modes (b) and (c) shown in FIG. 1, whereby no substantial temperature fall was observed, either.

EXAMPLE 3

The same apparatus as used in Example 1 was equipped with a regenerated cellulose flat membrane (thickness 200 μm). A methanol-methyl acetate mixture vapor (methanol 50% by weight) at its normal boiling point (56° C.) was fed to the apparatus at a rate of 0.085 kg/hr and the procedure of Example 1 was followed (liquid film thickness 1,000 μm). The permeate fraction obtained at a rate of 0.005 kg/hr had a methanol purity of 82.2% by weight, while a fraction having a methanol concentration of 48.0% (by weight) was obtained as the non-permeated liquid at a rate of 0.080 kg/hr. The liquid film temperature was 56° C. on the upstream side and 55° C. on the downstream side and thus was almost constant.

EXAMPLE 4

A methanol-benzene mixture vapor (methanol 50% by weight) at its normal boiling point(60° C.)was fed to the module unit used in Example 3 at a rate of 0.080 kg/hr and the procedure of Example 1 was followed (liquid film thickness 1,000 μm). Methanol having a purity of 90.4% by weight was obtained as the permeate fraction at a rate of 0.003 kg/hr, and a fraction having a methanol concentration of 48.4% by weight was obtained as the non-permeated liquid at a rate of 0.077 kg/hr. The liquid film temperature was 60° C. on the upstream side and 59° C. on the downstream side, hence was almost constant.

COMPARATIVE EXAMPLE 2

A methanol-methyl acetate mixture liquid having a methanol concentration of 50% by weight was heated approximately to its boiling point (54° C.) and fed, in the liquid form, to the module unit used in Example 3 at a rate of 0.085 kg/hr and the procedure of Example 3 was followed. A methanol fraction having a methanol concentration of 82.9% by weight was obtained as the permeate fraction at a rate of 0.002 kg/hr, while a fraction having a methanol concentration of 49.2% by weight was obtained as the non-permeated liquid at a rate of 0.083 kg/hr. The liquid film temperature was 54° C. on the upstream side and 43° C. on the downstream side, hence the temperature fall amounted to 11° C.

COMPARATIVE EXAMPLE 3

A methanol-benzene mixture liquid having a methanol concentration of 50% by weight was heated approximately to its boiling point (58° C.) and fed, in the liquid form, to the module unit used in Example 4 at a rate of 0.080 kg/hr, and the procedure of Example 4 was followed. A fraction having a methanol concentration of 90.6% by weight was obtained as the permeate fraction at a rate of 0.002 kg/hr and a fraction having a methanol concentration of 49.0% by weight was obtained as the non-permeated liquid at a rate of 0.078 kg/hr. The liquid film temperature was 58° C. on the upstream side and 46° C. on the downstream side, hence the temperature drop amounted to 12° C.

EXAMPLE 5

An aqueous ethanol mixture having an ethanol concentration of 6% by weight as prepared from a crude aqueous ethanol from a fermentation process by preliminary removal of a low-boiling and a high-boiling fraction was fed to a distillation column (100 mm in diameter, 4,000 mm in height) packed with Sulzer BX packings (Sumitomo Heavy Industry Co., Ltd.). Operation of the column at a reflux ratio of about 30 gave a vapor close in composition to the azeotrope from the column top. Said vapor was fed, without cooling, to the module unit used in Example 1 in a direction approximately perpendicular to the liquid film at a rate of 1.097 kg/hr, and the procedure of Example 1 was followed. The results obtained were comparable to those obtained in Example 1.

The permeate fraction (aqueous ethanol having an ethanol concentration of 60% by weight) was then fed to a distillation column (25 mm in diameter, 4,000 mm in height) packed with McMahon packings, and the column was operated at a reflux ratio of about 30. An aqueous ethanol approximately of the azeotrope composition was obtained from the column top at a rate of 0.032 kg/hr, while water was obtained from the column bottom at a rate of 0.065 kg/hr.

The non-permeated liquid portion (aqueous ethanol having an ethanol concentration of 99.5%) was fed to a distillation column (25 mm in diameter, 4,000 mm in height) packed with McMahon packings and the column was operated at a reflux ratio of about 120, whereby an aqueous ethanol was obtained from the column top at a rate of 0.103 kg/hr and substantially anhydrous ethanol was obtained from the column bottom at a rate of 0.897 kg/hr. The distillate from each column top was an aqueous ethanol and therefore could be fed to the module unit after conversion of part thereof to a vapor form.

What is claimed is:

1. A method of separating liquid mixtures by pervaporation which comprises feeding a feed liquid mixture to a membrane separator in the form of a mixed fluid at least part of which is in the form of a vapor to thereby cause said vapor to come into direct contact with a liquid film originating from the liquid mixture and occurring on a permeation membrane such that said vapor is partially condensed in said liquid film, to obtain a permeate fraction and a non-permeated liquid portion.

2. The method of claim 1, wherein the enthalpy of said mixed fluid is equal to or greater than the sum of the enthalpy of said permeate fraction and the enthalpy of said non-permeated liquid.

3. The method of claim 1, wherein said mixed fluid is a vapor or a vapor-liquid mixture from a distillation column.

4. The method of claim 1, wherein said liquid film is flowing along said membrane and wherein said mixed fluid is fed to the membrane separator in a direction approximately perpendicular to the direction of liquid film flow.

5. The method of claim 1, wherein the vapor in said mixed fluid amounts to 3 to 100 by weight.

6. The method of claim 1, wherein said liquid film has a thickness of 0.1 to 10 mm.

7. The method of claim 1, wherein the permeate fraction and/or the non-permeated liquid portion is further purified in a distillation column.

8. The method of claim 5, wherein the amount of said vapor in said mixed fluid is from 5 to 85% by weight.

9. The method of claim 6, wherein said liquid film has a thickness of from 0.2 to 5 mm.

10. The method of claim 1, wherein said membrane is composed of one member selected from the group consisting of polyethylene, polyvinylidene fluoride, polyvinyl alcohol, polyvinyl acetate, polymethylsiloxane, polyethylenimine, polybutadiene, polyvinyl chloride, cellulose acetate, polystyrene, silicone rubber, regenerated cellulose, polyamide, polyimide, polyamide-imide, and natural polysaccharides.

11. The method of claim 10, wherein said polyvinyl alcohol is a vinyl alcohol-based copolymer.

12. The method of claim 11, wherein said vinyl alcohol-based copolymer is an ethylene-vinyl alcohol copolymer.

13. The method of claim 1, wherein said membrane has a thickness of from 1 to 500 μm.

14. The method of claim 13, wherein said membrane has a thickness of from 5 to 200 μm.

* * * * *